UNITED STATES PATENT OFFICE.

GEORGE G. GAYMAN AND SAMUEL B. GAYMAN, OF RACINE, PENNSYLVANIA.

VETERINARY REMEDY.

SPECIFICATION forming part of Letters Patent No. 459,178, dated September 8, 1891.

Application filed May 21, 1891. Serial No. 393,626. (No specimens.)

*To all whom it may concern:*

Be it known that we, GEORGE G. GAYMAN and SAMUEL B. GAYMAN, citizens of the United States, residing at Racine, in the county of Washington and State of Pennsylvania, have invented certain new and useful Improvements in Compositions for the Cure of Foot-Rot in Sheep, of which the following is a specification.

Our invention has for its object the provisions of a composition of matter for the effective treatment of certain diseases in domestic animals, and more especially for what is known as "foot-rot" in sheep. The composition consists in the combination of certain curative ingredients with a sufficient amount of diluting liquid, as hereinafter set forth, and pointed out in the claim, to form a composition which we have found to be a reliable remedy for the disease known as "foot-rot" in sheep, as above stated. The composition may also be found useful in treating other diseases of sheep or other animals.

Our composition consists of the following ingredients combined in about the proportions specified, viz: water, three quarts; vinegar, one quart; sulphate of copper, one and one-half pounds; common salt, one and one-half pounds; spirits of turpentine, two ounces; sugar of lead, one ounce; inner bark of the white-oak, two pounds. These ingredients are mingled together, the soluble solids dissolved, and the strength of the white-oak bark extracted by immersion in the liquid of the composition. If it is desired, the white-oak bark may be immersed in the water or vinegar or both for a sufficient length of time to extract all its sap and juices (its strength) before adding the remaining ingredients. The proportions above given may be varied to suit different cases, if desired.

In using the above composition for the treatment of foot-rot in sheep we have obtained the best results by placing the animal in a box or vat with a sufficient amount of our composition in it to cover the diseased foot or feet of the animal, and then heating the composition in any convenient manner to about 120° Fahrenheit. We have also obtained good results from its use by paring the foot of the animal and applying the composition thereto with a brush or other means, in which case the composition may be used cold.

Having thus described our invention, what we claim, and desire to secure by Letters Patent of the United States, is—

The herein-described composition of matter for use in the treatment of foot-rot in sheep, consisting of water, vinegar, sulphate of copper, common salt, spirits of turpentine, sugar of lead, and inner bark of the white-oak, in about the proportions hereinbefore specified.

In testimony whereof we affix our signatures in presence of two witnesses.

GEORGE G. GAYMAN.
SAMUEL B. GAYMAN.

Witnesses:
M. M. CLEAVER,
J. W. ELWOOD.